UNITED STATES PATENT OFFICE.

ANDREW JOHNSON ALEXANDER, OF MAYFIELD, KENTUCKY.

REMEDY FOR HOG AND CHICKEN CHOLERA.

SPECIFICATION forming part of Letters Patent No. 338,013, dated March 16, 1886.

Application filed November 7, 1885. Serial No. 182,149. (No specimens.)

*To all whom it may concern:*

Be it known that I, ANDREW JOHNSON ALEXANDER, a citizen of the United States, residing at Mayfield, in the county of Graves and State of Kentucky, have invented a new and useful Composition of Matter to be Used for the Treatment and Prevention of Hog and Chicken Cholera, of which the following is a specification.

My composition consists of the following ingredients, combined in the proportions stated, viz: pure water, two gallons; tobacco, two pounds; mandrake root, (in powder,) one pound; bichromate potassa, one ounce; alcohol, one pint. These ingredients are to be thoroughly mixed by boiling the tobacco and mandrake in the amount of water named down to one gallon and expressing all the juice. Then add while the mixture is hot the bichromate potassa finely powdered. Set aside to cool, and then add the alcohol, when it is ready for use.

For the prevention of hog-cholera give one tea-spoonful to each grown hog in slop or milk once a day. For the treatment of the cholera give one tea-spoonful in slop or milk three times a day. For smaller hogs or pigs or chickens give a proportional less quantity.

I am aware that a composition consisting of tobacco and may-apple (mandrake) root has been used for the disease named—the cure of hog-cholera—and that a United States patent therefor, No. 282,949, was granted therefor to Be Vier; but I am not aware that all the ingredients named in the proportions stated have been used together for this purpose.

What I claim, and desire to secure by Letters Patent of the United States, is—

The herein-described composition of matter to be used for the treatment and prevention of hog and chicken cholera, consisting of water, tobacco, mandrake-root, bichromate potassa, and alcohol, in the proportions specified.

ANDREW JOHNSON ALEXANDER.

Witnesses:
JOHN DAVID JEFFREY,
DAVIDSON MCNEAL ALEXANDER.